Jan. 15, 1935.   E. E. BOWEN   1,988,157

PLOW HITCH

Filed Feb. 9, 1934   2 Sheets-Sheet 1

INVENTOR:
EDSON E. BOWEN
Kwis Hudson & Kent
ATTORNEYS

Jan. 15, 1935.   E. E. BOWEN   1,988,157
PLOW HITCH
Filed Feb. 9, 1934   2 Sheets-Sheet 2

INVENTOR:
EDSON E. BOWEN
Kwis Hudson & Kent
ATTORNEYS

Patented Jan. 15, 1935

1,988,157

UNITED STATES PATENT OFFICE 1,988,157

PLOW HITCH

Edson E. Bowen, Greenwich, Ohio, assignor to The Fate-Root-Heath Company, Plymouth, Ohio, a corporation of Ohio Application February 9, 1934, Serial No. 710,536

8 Claims. (Cl. 97—47)

This invention relates to improvements in plow hitches, that is to say means for detachably mounting a plow upon a wheeled vehicle such as a tractor.

One of the objects of the invention is the provision of a plow hitch of relatively simple construction which may be removably connected with a tractor frame, and one which will leave the plow free to swing vertically to a limited extent while holding it against tilting movement.

Another object is the provision of means for readily adjusting the plow to its proper vertical position when the vehicle is tilted sidewise to a greater or lesser extent.

Other objects and features of novelty will appear as I proceed with the description of that embodiment of the invention which, for the purposes of the present application, I have illustrated in the accompanying drawings, in which Fig. 1 is a side elevational view of a plow and plow frame embodying the invention.

Figure 4:
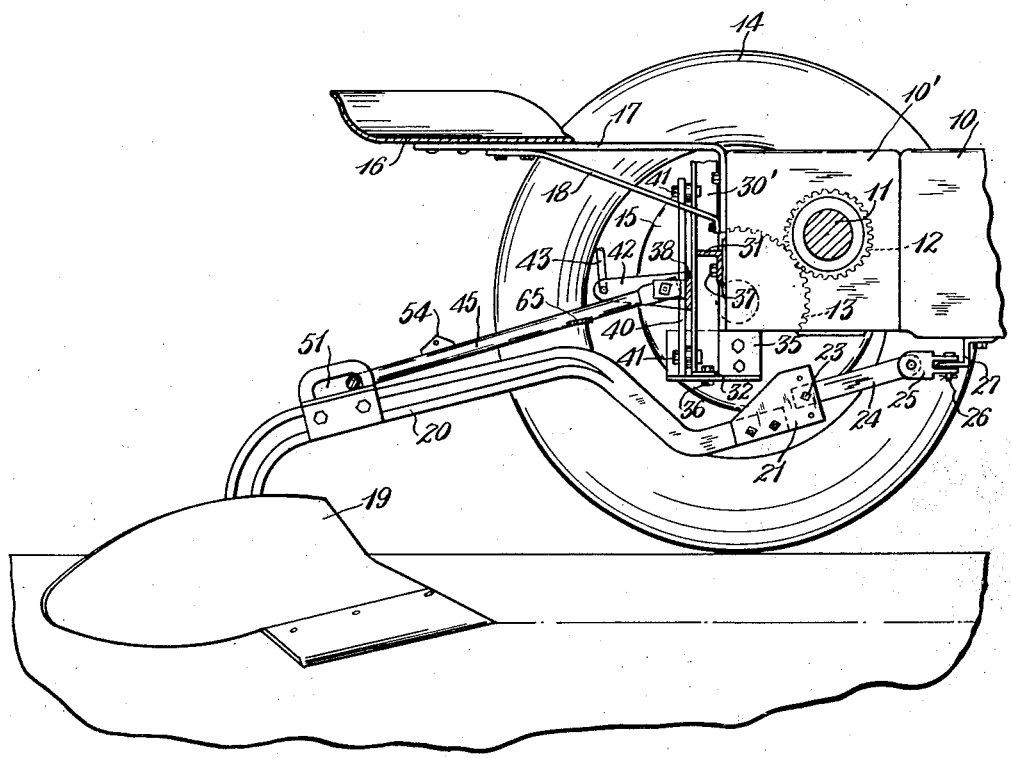
Fig. 4 is an elevational view of the plow hitch applied to the rear end of a tractor, one wheel of the tractor being removed and certain other parts shown in section.
Figure 5:
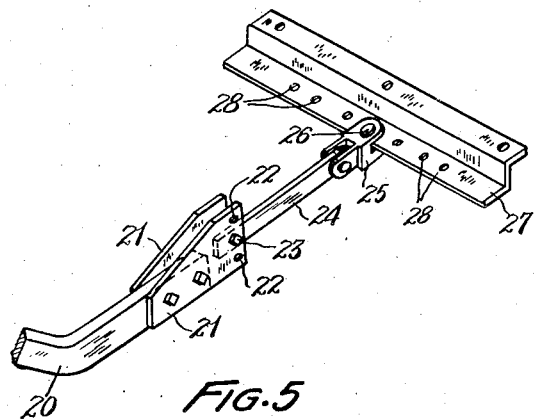
Fig. 5 is a fragmental perspective view showing the draft connection between the tractor and the forward end of the plow beam.

The present invention may be employed as an attachment for various kinds of wheeled vehicles, but is preferably used in connection with a tractor, and is so illustrated in Fig. 4. In that figure, a part of the frame of the tractor is shown at 10. 11 is the rear axle, which may be in two parts with a differential between them. The differential housing 10' and the rear shaft housings may, and preferably do, constitute a part of the tractor frame. The rear axle shafts are mounted in the frame 10, and at the outer end of each shaft there is carried a pinion 12 which meshes with a gear 13 rigid with the ground wheel 14. This gearing is protected by a casing 15 which is integral with or secured to the frame 10, being carried at the outer end of the axle housing, not shown. A driver's seat 16 is attached to the differential housing 10' by means of a metallic bracket 17 with a brace 18.

The tractor construction just referred to is shown by way of example only, and is not of importance per se in so far as the present invention is concerned.

The plow, shown at 19, is mounted on the rear end of a plow beam 20. Two plates 21 are bolted to the forward end of the beam on opposite sides thereof, and in these plates there are a series of registering holes 22 for the reception of a pin or bolt 23 by means of which a link 24 is pivotally connected with the beam. The link 24 constitutes part of a draft connection between the beam 20 and the tractor frame 10. At its forward end the link 24 may be pivoted to a double clevis 25 which is pivotally connected by a bolt or pin 26 with the lower flange of a Z-bar 27 that is bolted to the underside of the frame 10. This Z-bar is preferably provided with a series of holes 28 for the reception of the pin 26, whereby the draft connection may be adjusted transversely to any one of several positions.

The plow frame is a transverse vertical frame comprising principally two vertical angle irons 30 and 30' connected intermediate their ends by a horizontal angle iron 31. At the lower end of each of the vertical members 30 and 30' there is welded or otherwise secured a rectangular plate 32 having a bolt hole 33 therethrough. The horizontal angle iron 31 is also provided with a bolt hole 34 about midway of its length. To each of the gear housings 15 there is bolted an angle clip 35 (Fig. 4). When the plow frame is attached to the tractor frame, the plates 32 are caused to rest upon the horizontal flanges of the angle clips 35, and are secured thereto by bolts 36 extending through the bolt holes 33. The horizontal angle iron 31 is then attached to the differential housing 10' by means of a bolt 37 extended through the hole 34 in the angle iron. This three-point support holds the plow frame rigidly in position upon the tractor frame.

Figure 3:
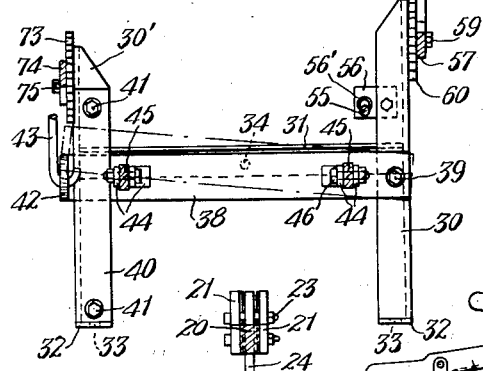
Fig. 3 is a vertical transverse section taken substantially on the line 3—3 of Fig. 2, showing the plow frame.

On the rear side of the plow frame behind horizontal angle iron 31 there is a transverse bar 38 which is pivoted at one end upon a bolt 39 mounted in frame member 30. The opposite end of bar 38 is arranged to move through a guide slot formed by frame member 30' and a flat bar 40 spaced therefrom by washers or the like, and secured thereupon by bolts 41. This bar 38 is adapted to swing upon pivot 39 as indicated by dotted lines in Fig. 3. At its free end beyond the guide slot it has a rearwardly extending arm 42 with a hole therethrough for pivotal attachment to a link rod 43 by means of which the bar 38 may be swung upwardly or downwardly upon its pivot, for a purpose which will hereinafter appear.

Attached to the rear side of bar 38 by suitable means such as welding, are two pairs of brackets 44. A bail 45 with flattened forward ends is pivotally mounted between the brackets of the two pairs by means of bolts 46. To the plow beam 20 near the rear thereof there is attached a yoke which may consist of a pair of Z-shaped brackets. One flange 47 of each bracket rests against a side of the plow beam and the two corresponding flanges of the two brackets are fastened to the beam by bolts 48. The two brackets have outwardly extending horizontal flanges 49 which are substantially flush with the top surface of the beam 20, and upwardly extending outer flanges 50 in which there are slots 51. The rear end of the bail 45 has a straight transverse portion 52 somewhat longer than the distance between the flanges 50, this straight portion extending through the slots 51. Hence the yoke made up of these brackets is adjustable transversely to a limited extent upon the bail 45 in accordance with transverse adjustments of the draft link 24 upon the Z-bar 27.

The bail 45 and the plow and plow beam 19, 20 are preferably counterbalanced. A suitable means for the purpose is a coil spring 53 attached at its rear end to a bracket 54 which may be welded to the bail, and at its forward end to a threaded rod 55 which extends through a hole or slot in a plate 56 fastened by suitable means to the frame member 30, see particularly Fig. 3. A nut 56' on the threaded rod 55 behind plate 56 serves as an adjustment means for varying the tension upon the spring 53. The latter spring tends to hold the plow in an elevated position.

In order to push the plow into the earth as the vehicle moves, I provide an operating lever 57 with an extension 58 projecting upwardly from the lever at the point of the pivot 59 which is anchored in the frame member 30 and pivotally supports the lever 57 with its extension 58. A toothed segment 60 is rigidly secured to the frame member 30 by welding or otherwise. 61 is a rod which is pivoted in one of a plurality of holes at the top of extension 58. A collar 62, loose on the rod and backed by a cotter pin 63 extending through the rod, engages the upper end of a coil spring 64 which surrounds the rod and bears at its lower end upon an ear 65 welded to the bail 45. This ear is provided with a hole through which the rod 61 extends. At its lower end the rod 61 is provided with some means for engaging the lower surface of the ear 65, as for instance a washer 66 held against downward movement by a cotter pin. On the lever 57 there is mounted a slide 67 with a tooth at its forward extremity for engagement with the toothed sector 60. This slide is impelled forward by a spring 68 working against a stop 69. The slide is connected with and adapted to be retracted by a rod 70, the latter being operated against the action of spring 68 by means of a wire 71 and a hand grip 72 on the lever.

When the operator desires to depress the plow, he squeezes grip 72, withdrawing slide 67 from engagement with sector 60, and then pushes the operating lever 57 down. By this means the extension 58 is swung toward the left, as viewed in Fig. 1, which results in the depression of the rod 61. The cotter pin 63, working through the collar 62, thereby puts pressure upon the spring 64 and thus exerts a downward force upon the ear 65. The tooth of slide 67 is then permitted to enter the sector 60 lower down at some selected point. The downward force thus exerted upon the bail 45, against the action of counterbalance springs 53, causes the plow to dig into the ground until it reaches a depth predetermined by the setting of the slide 67. Now, when it is desired to raise the plow, the operator disengages slide 67 and raises the operating lever 57, relieving the pressure upon spring 64 and permitting spring 53 to act to exert an upward pull upon bail 45. In the event that this pull is not sufficient to raise the plow, the operator can assist by pulling up upon lever 57, which tilts lever extension 58 thereby drawing the rod 61 upward, which operation can be continued to an extent sufficient to cause washer 66 to engage the underside of ear 65, exerting a further lifting force upon bail 45.

A second toothed sector 73 is welded to the other vertical frame member 30', and an operating lever 74 is pivoted at 75 upon this frame member. This lever carries latch means similar to that described for lever 57, by means of which it is held in any desired position upon the sector 73. In order to avoid confusion in the drawing these parts have not been numbered and will not be further described. The rod link 43, previously referred to, is pivotally connected at its upper end with the lever 74, and by means of that lever therefore the bar 38 may be swung up or down upon its pivot 39.

Since the bar 38 carries the bail 45, and since the transverse part 52 of the bail is restrained from tilting movement with respect to the beam 20 by means of the spaced vertical flanges 50 of the yoke, it will be obvious that a movement of the bar 38 up or down upon its pivot will serve to tilt the plow beam to the extent desired. Such a tilting adjustment enables the operator to keep the plow in its proper vertical position when the tractor to which the plow frame is hitched is tilted out of the horizontal on account of having one wheel in the previous furrow while the other is running upon the unplowed ground. The tilting adjustment is also very useful where the plow is being used upon a hill side. The draft connections at the forward end of the plow beam are purposely made loose enough to permit all of the angular or tilting adjustment of the plow beam which may be necessary.

Figure 2:
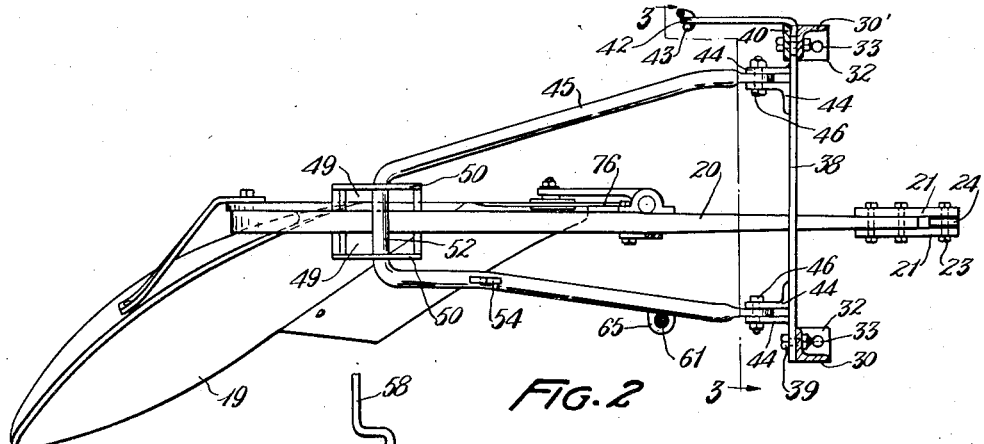
Fig. 2 is a top plan view partly in horizontal section upon the line 2—2 of Fig. 1.
Figure 1:
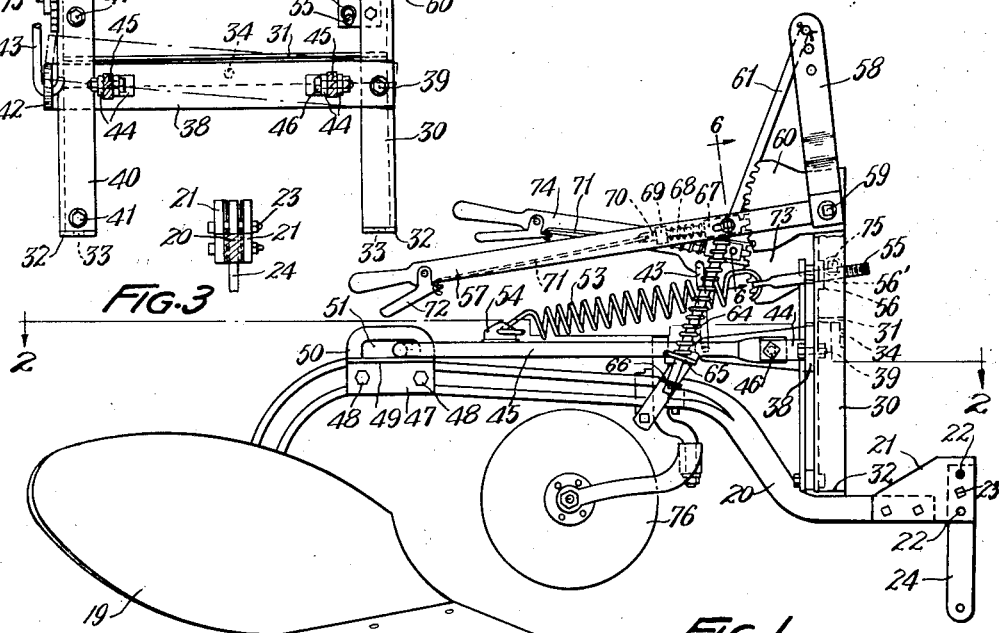
Figure 6:
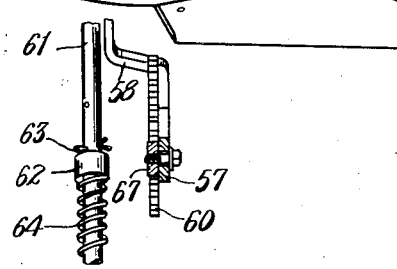
Fig. 6 is a fragmental detailed view partly in section on the line 6—6 of Fig. 1.

In Figs. 1, 2 and 7 I have shown a coulter 76 mounted upon the plow beam, but obviously this may be omitted, or one of another type substituted, without affecting the invention herein claimed.

It will be observed that the plow hitch which I have herein disclosed is of a sturdy character, well adapted for use upon small tractors, and that it provides quick and easy adjustments of the plow both up and down and angularly with respect to a longitudinal axis, regardless of the transverse adjustment to regulate the width of the furrow. The plow furthermore is supported or held to the work by means which permit it to float, so to speak. In other words, the depth of the furrow is not affected by small inequalities in the contour of the ground directly adjacent the plow, and if an obstruction such as a stone is encountered the plow support can yield, enabling the plow point to be deflected over or under the obstruction.

Having thus described my invention, I claim:
1. In a plow hitch for wheeled vehicles, a plow beam, a draft connection at the forward end of the beam permitting movement of the beam in a vertical direction and limited rotation thereof about a longitudinal axis, a plow frame adapted to be rigidly connected with the frame of the vehicle to the rear of said draft connection, and means carried by the plow frame for resiliently supporting the rear end of the beam, for holding it at a desired angle different from that of the wheels of the vehicle, and for yieldably holding it down to the work.

2. In a plow hitch for wheeled vehicles, a plow frame, means for attaching the plow frame rigidly to the rear end of a vehicle frame, a bar mounted to swing in said plow frame in a vertical transverse plane, means for holding said bar adjustably in any one of a plurality of different positions, a bail hinged to said bar extending rearwardly therefrom, a plow beam, a loose connection between the rear end of said bail and said beam, said connection preventing relative tilting movement between the bail and beam, means for tilting the bar, counterbalancing means tending to hold the rear ends of the bail and beam in elevated position, and yieldable means tending to hold the plow beam down.

3. In a plow hitch for wheeled vehicles, a frame, means for attaching the frame rigidly to the rear end of the vehicle frame, whereby the plow frame is tilted when the vehicle is tilted, a bar mounted to swing in said plow frame in a vertical transverse plane, means for holding said bar in any one of a plurality of different positions, a bail hinged to said bar and extending rearwardly therefrom, a plow beam supported from the rear end of said bail, said beam extending forward beyond the plow frame, and means for connecting the forward end of the beam to the vehicle.

4. A plow hitch for wheeled vehicles, comprising a plow beam having a draft connection permitting a vertical swinging movement of the beam and limited rotation thereof about a longitudinal axis, a vertical transverse frame adapted to be rigidly connected with the frame of the vehicle to the rear of said draft connection, a transversely hinged bail carried by said frame for raising and lowering the beam to raise and lower the plow, said bail being tiltable transversely on said frame, lever means for swinging said bail upon its hinges, and lever means for tilting said bail.

5. A plow hitch for wheeled vehicles, comprising a plow beam having a draft connection permitting vertical swinging movement of the beam and limited rotation thereof about a longitudinal axis, a vertical transverse frame adapted to be rigidly connected with the frame of the vehicle, means carried by said frame for raising the beam, and means carried by said frame for tilting said beam raising means, whereby the plow may be adjusted about said longitudinal axis.

6. A plow hitch for wheeled vehicles, comprising a plow beam having a draft connection permitting vertical swinging movement of the beam and limited rotational movement thereof about a longitudinal axis, a vertical transverse frame adapted to be rigidly connected with the frame of the vehicle, a bail hinged to said frame and extending rearwardly therefrom, means connecting the rear end of said bail with said beam, said means being adapted to prevent relative transverse tilting movement between the bail and the beam, means carried by the frame for raising and lowering the rear end of the beam, and means carried by the frame for tilting the bail, whereby the plow may be adjusted about said longitudinal axis.

7. A plow hitch for wheeled vehicles, comprising a plow beam having a draft connection permitting vertical swinging movement of the beam and limited rotational movement thereof about a longitudinal axis, a frame arranged substantially in a vertical transverse plane adapted to be rigidly connected with the frame of the vehicle, a bail hingedly mounted in said plow frame and extending rearwardly therefrom, means connecting the rear end of said bail with said beam, said means being adapted to prevent relative transverse tilting movement between the bail and the beam, lever and link mechanism carried by the frame extending rearwardly therefrom for raising and lowering the rear end of the beam, and lever and link mechanism also carried by the frame for tilting the bail in a transverse vertical plane.

8. A plow hitch for wheeled vehicles, comprising a plow beam having a draft connection permitting vertical swinging movement of the beam and limited rotational movement thereof about a longitudinal axis, a frame arranged substantially in a vertical transverse plane adapted to be rigidly connected with the frame of the vehicle, a transverse bar, means in the frame for pivoting the bar at one end to swing it in a vertical transverse plane and for guiding it at the other end, a bail hinged to said bar and extending rearwardly therefrom, means connecting the rear end of said bail with said beam, mechanism for swinging said bar comprising a lever carried by the plow frame and having operative positions to the rear of that frame, and mechanism for tilting said bail comprising a lever carried by the plow frame and having operative positions to the rear of that frame.

EDSON E. BOWEN.